United States Patent Office 3,147,276
Patented Sept. 1, 1964

3,147,276
PYRAZOLONES
David John Drain and Roy Stanley Shadbolt, Welwyn Garden City, England, assignors to T. J. Smith & Nephew Limited, Kingston-upon-Hull, Yorkshire, England, a British company
No Drawing. Filed Aug. 22, 1961, Ser. No. 133,046
Claims priority, application Great Britain Aug. 23, 1960
8 Claims. (Cl. 260—310)

The present invention relates to pyrazolones and to processes for their preparation.

It is an object of the invention to provide new and useful pyrazolone derivatives.

It is a further object of the invention to provide compounds which will alleviate inflammatory conditions in human beings.

We have now discovered certain novel substituted pyrazolones which have useful anti-inflammatory properties when administered to human beings. These substituted pyrazolones have the following general formula:

(I)
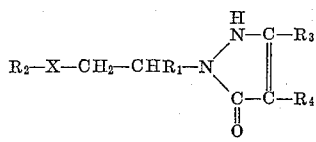

wherein
$R_1$ represents a hydrogen atom or an alkyl group containing from 1 to 3 carbon atoms,
X represents an oxygen atom or a sulphur atom or the group NH,
$R_2$ represents a substituted phenyl radical, an unsubstituted phenyl radical or a naphthyl radical,
$R_3$ represents an alkyl group containing from 1 to 4 carbon atoms, an aralkyl group or an aryl group, and
$R_4$ represents a hydrogen atom (or $R_3$ and $R_4$ together represent an alkylene group).

According to one feature of the invention there are provided pyrazolones of general Formula I.

According to a further feature of the invention there is provided a process for the preparation of pyrazolones of general Formula I which comprises condensing a substituted hydrazine of the general formula:

(II)     $R_2$—X—$CH_2$—$CHR_1$—NH—$NH_2$ wherein $R_1$, and $R_2$ and X have the meanings given above, or an acid addition salt of such a substituted hydrazine, with a β-keto-carboxylic ester of the general formula:

(III)     $R_5O$—CO—$CHR_4$—CO—$R_3$ wherein $R_3$ and $R_4$ have the meanings given above, and $R_5$ represents an alkyl group containing from 1 to 4 carbon atoms.

When $R_1$ in the above formulae represents an alkyl group, this may be, for example, methyl, ethyl or propyl.

When $R_2$ in the above formulae represents a substituted phenyl radical, this may contain one substituent or two or more substituents which may be the same or different. Examples of such substituents are hydroxyl, lower alkyl, lower alkoxyl, lower alkylenedioxy and halogen. A suitable lower alkyl radical is methyl. Suitable lower alkoxyl radicals are methoxyl and n-butoxyl. A suitable alkylenedioxy radical is methylenedioxy. A suitable halogen is chlorine.

When $R_3$ in the above formulae represents an alkyl group, this may be, for example, methyl, ethyl, n-propyl, or n-butyl. When $R_3$ represents an aralkyl radical, this may be benzyl and when it represents an aryl radical, this may be phenyl.

$R_5$ may be, for example, methyl, ethyl, n-propyl or n-butyl.

When $R_3$ and $R_4$ together represent an alkylene group, this may be, for example, butylene.

The condensation of an acid addition salt of a substituted hydrazine of general Formula II with a β-keto-carboxylic ester of general Formula III proceeds readily when the reactants are brought together in the presence of a strongly basic condensing agent, such as an alkali metal hydroxide or alcoholate, e.g., sodium hydroxide or sodium ethylate. The sodium hydroxide may be in aqueous solution and the sodium ethylate may be in ethanolic solution. Heating accelerates the reaction and is preferably employed. The reactants may be conveniently heated by refluxing in a lower aliphatic alcohol such as ethanol.

The condensation of a substituted hydrazine of general Formula II with a β-keto-carboxylic ester of general Formula III proceeds in some cases on merely bringing the reactants together, preferably in a mutual inert solvent such as a lower aliphatic alcohol, for example, ethanol.

Among the β-keto-carboxylic acid esters of general Formula II which can be employed may be mentioned ethyl acetoacetate, ethyl propionacetate, ethyl benzoylacetate, ethyl phenylacetoacetate, ethyl cyclopentanone-2-carboxylate and ethyl cyclohexanone-2-carboxylate.

In general, the substituted hydrazines of general Formula II can be made by heating with hydrazine a compound of the general formula:

(IV)     $R_2$—X—$CH_2$—$CHR_1$—Y wherein $R_1$, $R_2$ and X have the meanings given above, and Y represents a halogen atom having an atomic weight above 20.

The hydrazine is preferably employed in the form of hydrazine hydrate. The process is most suitably carried out in an inert solvent, such as a lower alkanol, e.g., ethanol. The reaction is favoured by heating and when the process is carried out in an inert solvent the solution may be boiled under reflux.

Among the substituted hydrazines of general Formula II which can be employed may be mentioned 2-phenoxyethyl-hydrazine and 1-methyl-2-phenoxyethyl-hydrazine. Other substituted hydrazines of general Formula II which can be used are those described in specification Ser. No. 21,599, filed April 12, 1960, and now abandoned. Those whose manufacture is described in detail in the said specification are those in which $R_1$, X and $R_2$ have the meanings shown in the following table.

TABLE

| No. | R₁ | X | R₂ |
|---|---|---|---|
| 1 | H | O | 2-methylphenyl. |
| 2 | H | O | 4-methylphenyl. |
| 3 | H | O | 3,4-dimethylphenyl. |
| 4 | H | O | 3,5-dimethylphenyl. |
| 5 | H | O | 2-benzylphenyl. |
| 6 | H | O | α-naphthyl. |
| 7 | H | O | β-naphthyl. |
| 8 | H | O | 4-hydroxyphenyl. |
| 9 | H | O | 2-methoxyphenyl. |
| 10 | H | O | 3-methoxyphenyl. |
| 11 | H | O | 4-methoxyphenyl. |
| 12 | H | O | 4-n-butoxyphenyl. |
| 13 | H | O | 4-methylthiophenyl. |
| 14 | H | O | 2,4-dimethoxyphenyl. |
| 15 | H | O | 2,5-dimethoxyphenyl. |
| 16 | H | O | 2,6-dimethoxyphenyl. |
| 17 | H | O | 3,4-dimethoxyphenyl. |
| 18 | H | O | 3,4,5-trimethoxyphenyl. |
| 19 | H | O | 2-methoxy-4-alkylphenyl. |
| 20 | H | O | 3,4-methylenedioxyphenyl. |
| 21 | H | O | 3-chlorophenyl. |
| 22 | H | O | 4-chlorophenyl. |
| 23 | H | S | Phenyl. |
| 24 | H | S | 4-methoxyphenyl. |
| 25 | H | S | 3,4-dichlorophenyl. |
| 26 | CH₃ | O | Phenyl. |
| 27 | CH₃ | O | 2-methoxyphenyl. |
| 28 | CH₃ | O | 4-methoxyphenyl. |
| 29 | CH₃ | O | 4-methylthiophenyl. |
| 30 | C₂H₅ | O | Phenyl. |
| 31 | n-C₃H₇ | O | Do. |
| 32 | CH₃ | S | Do. |
| 33 | CH₃ | S | 4-methoxyphenyl. |
| 34 | H | NH | Phenyl. |
| 35 | CH₃ | NH | Do. |

The invention will be illustrated by but is not limited to the following examples in which the weights and volumes are in grams and millilitres respectively and the temperatures are in degrees centigrade.

*Example 1.—3-Methyl-1-(2-Phenoxyethyl)-3-Pyrazolin-5-One*

2-phenoxyethyl-hydrazinium (1+) chloride (9.42 g., 0.05 mole) was added to a solution of sodium (1.15 g., 0.05 mole) in ethanol (40 ml.). Ethyl acetoacetate (6.3 ml., 0.05 mole) was added, and the mixture heated under reflux for 1 hour. The solid was filtered off and the filtrate evaporated under reduced pressure. The residue after recrystallising first from a mixture of benzene and cyclohexane, and then from cyclohexane alone gave 3-methyl-1-(2-phenoxyethyl) - 3 - pyrazolin-5-one. M.P. 128–9°.

$C_{12}H_{14}N_2O_2$ requires: C, 66.0; H, 6.5; N, 12.8. Found: C, 66.0; H, 6.5; N, 12.8.

*Example 2.—1[2-(4-Hydroxyphenoxy)Ethyl]-3-Methyl-3-Pyrazolin-5-One*

2-(4-hydroxyphenoxy)ethyl-hydrazinium (1+) chloride (29.5 g., 0.145 mole) was added to a solution of sodium (3.325 g., 0.145 mole) in ethanol (120 ml.). Ethyl acetoacetate (10.5 ml., 0.145 mole) was added, and the mixture heated under reflux for 45 minutes. The hot solution was filtered and cooled to give 1-[2-(4-hydroxyphenoxy)ethyl]-3-methyl - 3 - pyrazolin-5-one (26.3 g., M.P. 151–4°). Recrystallisation from ethanol gave pale yellow prisms, M.P. 155–6°.

*Example 3.—1-(1-Methyl-2-Phenoxy)Ethyl-3-Methyl-3-Pyrazolin-5-One*

(1-methyl-2-phenoxy)ethyl-hydrazinium (1+) hydrogen maleate (20.6 g.) was suspended in water (50 ml.) and 50% sodium hydroxide solution added until the solution was strongly alkaline. The oil was extracted several times with diethyl ether, and the ether extracts combined, dried (MgSO₄, and evaporated to give the base (11.3 g.).

The base (11.3 g., 0.068 mole), ethyl acetoacetate (8.7 ml., 0.068 mole) and ethanol (25 ml.) were heated under reflux for 45 minutes. On cooling and allowing to stand, 1-(1-methyl-2-phenoxy)ethyl-3-methyl-3-pyrazolin-5-one crystallised (5.25 g.), M.P. 129–30°. Two recrystallisations from ethyl acetate gave needles, M.P. 130–131°.

*Example 4.—1-(1-Methyl-2-Phenoxy)Ethyl-3-Methyl-3-Pyrazolin-5-One (Alternative Method)*

Ethyl acetoacetate (6.35 ml., 0.05 mole), (1-methyl-2-phenoxy)ethyl-hydrazinium (1+) hydrogen maleate (14.1 g., 0.05 mole), and water (100 ml.) were heated on a steam bath under an atmosphere of nitrogen, and sodium hydroxide (2.0 g., 0.05 mole) in water (25 ml.) added to the stirred mixture over 20 minutes. Stirring and heating were continued for 2 hours, the mixture cooled and the oil extracted with chloroform. The chloroform was dried (Na₂SO₄), evaporated, and the residue dissolved in diethyl ether (50 ml.). On seeding, 1-(1-methyl-2-phenoxy)ethyl-3-methyl-3-pyrazolin-5-one crystallised (6.6 g.), M.P. 127–8°. Two recrystallisations from ethyl acetate gave colourless needles, M.P. 130–131°.

*Example 5.—1-(2-Anilinoethyl)-3-Methyl-3-Pyrazolin-5-One*

To crude 2-anilinoethyl-hydrazine (97.3 g., 0.645 mole) in ethanol (200 ml.), was added ethyl acetoacetate (82 ml., 0.645 mole). On leaving to stand overnight, 1-(2-anilinoethyl)-3-methyl-3-pyrazolin-5-one crystallised (45 g.), M.P. 126–8°. After two recrystallisations from ethanol there was obtained colourless crystals, M.P. 129–30°.

*Example 6.—1-(2-Phenylthioethyl)-3-Methyl-3-Pyrazolin-5-One*

(2-phenylthioethyl) hydrazinium (1+) hydrogen sulphate (2.4 g., 0.009 mole) was added to a solution of sodium (0.41 g., 0.0178 mole) in ethanol (10 ml.). The solid was filtered off, and ethyl acetoacetate (1.16 ml., 0.009 mole) added to the filtrate. The solution was heated under reflux for 30 minutes, and evaporated to a small volume. On cooling, 1-(2-phenylthioethyl)-3-methyl-3-pyrazolin-5-one crystallised (0.5 g., M.P. 84–6°. Recrystallisation from ethyl acetate gave the product, M.P. 90°.

*Example 7.—3-Oxo-2-(2-Phenoxyethyl)-2,3,4,5,6,7-Hexahydro (1H) Indazole*

Ethyl-1-cyclohexanone-2-carboxylate (8.5 g., 0.05 mole), 2-phenoxyethyl-hydrazinium (1+) chloride (9.4 g., 0.05 mole), and water (50 ml.) were heated to 90–100° C. on a steam bath. A solution of sodium hydroxide (2.0 g., 0.05 mole) in water (25 ml.) was added to the stirred and heated solution over 15 minutes. The mixture was heated and stirred for a further 30 minutes, and on cooling the oil solidified, M.P. 109–112°. This solid was recrystallised from ethyl acetate to give 3-oxo-2-(2-phenoxyethyl)-2,3,4,5,6,7-hexahydro (1H) indazole (6.3 g.), M.P. 126–7°. Two recrystallisations gave needles, M.P. 134–5°.

*Example 8.—3-Oxo-2-(2-Phenoxyethyl)-1,2,3,4,5,6-Hexahydro-cyclopenta-(C)-Pyrazol*

Ethyl 1-cyclopentanone-2-carboxylate (7.8 g., 0.05 mole), 2-phenoxyethyl-hydrazinium (1+) chloride (9.4 g., 0.05 mole), and water (25 ml.), were heated to 90–100° C. on a steam bath. A solution of sodium hydroxide (2 g., 0.05 mole) was added to the stirred and heated solution over 15 minutes. The mixture was stirred and heated for a further 15 minutes, and then cooled. The oil was extracted with chloroform, the chloroform dried (MgSO₄), and then evaporated to give a residue (13.5 g.). A solution of sodium (1.15 g., 0.05 mole) in ethanol (50 ml.) was added. The solution was heated under reflux for 30 minutes, the ethanol evaporated under reduced pressure, and heating on the steam bath continued for 15 minutes. Water (40 ml.) was added, and the solution neutralised with hydrochloric acid. The solid was filtered off, and recrystallisation from ethanol gave 3-oxo-2-(2-phenoxyethyl) - 1,2,3,4,5,6 - hexahydro - cyclopenta-(C)- pyrazol (7.3 g.), M.P. 167° C. Two recrystallisations from ethanol gave plates, M.P. 168–9° C.

The hydrazine compounds employed as starting materials in the foregoing examples were prepared as follows.

*For Examples 1, 7 and 8.—2-Phenoxyethyl-Hydrazinium (1+) Chloride*

2-phenoxyethyl bromide (26 g., 0.13 mole), 100% hydrazine hydrate (50 g., 0.99 mole) and ethanol (1 l.) were boiled under reflux for three hours. The solution was evaporated to dryness under reduced pressure on a steam bath, solid potassium hydroxide (25 g.) added, and the oil extracted several times with ether. The combined ether extracts were dried over potassium hydroxide, evaporated, and the residue distilled to give 2-phenoxyethyl-hydrazine as a colourless oil (13.3 g.=69%), B.P. 138–142°/9 mm.

The base (10 g.) was treated with concentrated hydrochloric acid (10 ml.) and the solution evaporated. The residue was recrystallised from ethanol/ethyl acetate as colourless needles of 2-phenoxyethyl-hydrazinium (1+) chloride (10.5 g., 78%), M.P. 142–3°.

*For Example 2.—2-(4-Hydroxyphenoxy)Ethyl-Hydrazinium (1+) Chloride*

2-(4-hydroxyphenoxy)ethyl bromide (26 g.) in ethanol (600 ml.) containing 100% hydrazine hydrate (48 ml.) was boiled under reflux for 3 hours. The solution was evaporated to dryness under reduced pressure and the solid residue treated with sodium carbonate solution and extracted with ether. The aqueous solution was evaporated to dryness under reduced pressure and the residue extracted twice with boiling ethanol. Concentration of the ethanolic extracts gave a solid which on recrystallisation from ethyl acetate yielded 2-(4-hydroxyphenoxy) ethyl-hydrazine as colourless crystals, M.P. 106°.

The hydrochloride was prepared by dissolving the hydrazine (4.4 g.) in ethanol (20 ml.) and adding ethanolic HCl (5 ml. of 7 N). Addition of ether precipitated a solid, which after recrystallisation from ethanol/ether yielded 2-(4-hydroxyphenoxy)ethyl-hydrazinium (1+) chloride (4.4 g.) as colourless crystals, M.P. 119–120°.

*For Examples 3 and 4.—(1-Methyl-2-Phenoxy)Ethyl-Hydrazinium (1+) Hydrogen Maleate*

(1-methyl-2-phenoxy)ethyl bromide (43 g., 0.2 mole), and 100% hydrazine hydrate (73.7 ml., 1.5 mole) in ethanol (750 ml.) was boiled under reflux for 32 hours. The reaction mixture was evaporated under reduced pressure and to the residue, concentrated hydrochloric acid (50 ml.) was added. Extraction of the acid solution with chloroform removed most of the product from the aqueous phase. The chloroform extract was washed with water and the aqueous layer was separated and evaporated to dryness under reduced pressure. The residue was treated with potassium hydroxide (20 g.) and the mixture extracted with ether. After drying the ethereal extract, it was evaporated on a steam bath and the residue distilled under reduced pressure. The product (12.4 g., B.P. 90–103/0.3 mm.) was collected after a fore-run (2.9 g., B.P. 26–54°/0.3 mm.).

The maleate was prepared by treating a solution of the base (0.3 g.) in ether (20 ml.) with a solution of maleic acid (0.19 g.) in methanol (3 ml.). (1-methyl-2-phenoxy)ethyl-hydrazinium (1+) hydrogen maleate was obtained as colourless prisms, M.P. 107–109°, from ethyl acetate.

*For Example 5.—2-Anilinoethyl-Hydrazine*

A mixture of crude N-β-bromoethyl-aniline hydrobromide (43.5 g., 0.155 mole), hydrazine hydrate (54 g., 1.08 moles) and ethanol (600 ml.) was heated under reflux for 6 hours. The alcohol and excess hydrazine hydrate were removed by distillation under reduced pressure, and the residual oil treated with excess anhydrous potassium carbonate. The mixture was extracted four times with 150 ml. portions of chloroform, the chloroform extract dried (Na$_2$SO$_4$) and the chloroform distilled. It was obtained as a colourless oil, B.P. 128–132°/0.5 mm. in 64% yield.

*For Example 6.—2-(Phenylthioethyl)Hydrazinium (1+) Hydrogen Sulphate*

2-phenylthioethyl bromide (32.5 g.) in ethanol (500 ml.) containing 100% hydrazine hydrate (60 g.) was boiled under reflux for 4 hours. The solution was evaporated to dryness under reduced pressure and the residue treated with aqueous potassium hydroxide (100 ml. of 15%) and extracted three times with diethyl ether, followed by three times with chloroform. The combined ethereal and chloroform extracts were dried, the solvents removed, and the residue distilled under reduced pressure to yield (2 - phenylthioethyl)hydrazine (14.7 g.:58%) as a colourless oil, B.P. 101–103°/0.05 mm. Hg.

The acid sulphate was prepared by dissolving the hydrazine (14.7 g.) in ethanol (100 ml.) and adding gradually a solution of concentrated sulphuric acid (8.5 g.) in ethanol (50 ml.). The precipitated solid was recrystallised from ethanol to yield (2-phenylthioethyl)hydrazinium (1+) hydrogen sulphate as colourless plates, M.P. 177° (decomp.).

We claim:

1. A substituted pyrazolone of the formula:

(I)

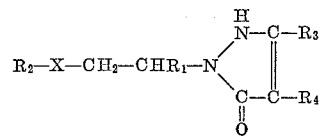

wherein
R$_1$ represents a member selected from the group consisting of a hydrogen atom and unsubstituted alkyl radicals of from 1 to 3 carbon atoms,
X represents a member selected from the group consisting of oxygen, sulphur and the radical NH,
R$_2$ represents a member selected from the group consisting of (a) a phenyl radical substituted by a substituent selected from the group consisting of the hydroxy radical, an unsubstituted lower alkyl radical, an unsubstituted lower alkoxy radical, an unsubstituted lower alkylenedioxy radical, and a halogen radical; (b) an unsubstituted phenyl radical; and (c) an unsubstituted naphthyl radical,
R$_3$ represents a member selected from the group consisting of unsubstituted alkyl radicals of from 1 to 4 carbon atoms and an unsubstituted phenyl radical, and
R$_4$ represents a hydrogen atom, provided R$_3$ and R$_4$ may together represent an unsubstituted alkylene radical of from 3 to 4 carbon atoms.

2. The compound 3-methyl-1-(2-phenoxyethyl)-3-pyrazolin-5-one.

3. The compound 1-[2-(4-hydroxyphenoxy)-ethyl]-3-methyl-3-pyrazolin-5-one.

4. The compound 1 - (1-methyl-2-phenoxy)ethyl-3-methyl-3-pyrazolin-5-one.

5. The compound 1-(2-anilino-ethyl)-3-methyl-3-pyrazolin-5-one.

6. The compound 1 - (2-phenylthioethyl)-3-methyl-3-pyrazolin-5-one.

7. The compound 3-oxo-2-(2-phenoxyethyl)-2,3,4,5,6, 7-hexahydro (1H) indazole.

8. The compound 3-oxo-2-(2-phenoxyethyl)-1,2,3,4,5,6-hexahydrocyclopenta-(C)-pyrazol.

References Cited in the file of this patent

UNITED STATES PATENTS

| | | |
|---|---|---|
| 2,681,915 | Gysin et al. | June 22, 1954 |
| 2,731,473 | Taub | Jan. 17, 1956 |
| 2,905,694 | Pinson | Sept. 22, 1959 |
| 2,955,108 | Omietanski | Oct. 4, 1960 |

FOREIGN PATENTS

| | | |
|---|---|---|
| 279,553 | Switzerland | Mar. 1, 1952 |
| 281,958 | Switzerland | July 16, 1952 |
| 281,965 | Switzerland | July 16, 1952 |

OTHER REFERENCES

Elderfield: "Heterocyclic Compounds," vol. 5, pp. 114–120 (1957).